United States Patent
Livesley et al.

(10) Patent No.: US 12,394,010 B2
(45) Date of Patent: Aug. 19, 2025

(54) PIPELINE DELAY ELIMINATION WITH PARALLEL TWO LEVEL PRIMITIVE BATCH BINNING

(71) Applicant: Advanced Micro Devices, Inc., Santa Clara, CA (US)

(72) Inventors: Michael John Livesley, Milton Keynes (GB); Ruijin Wu, Irvine, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 335 days.

(21) Appl. No.: 18/080,592

(22) Filed: Dec. 13, 2022

(65) Prior Publication Data
US 2023/0377086 A1 Nov. 23, 2023

Related U.S. Application Data

(60) Provisional application No. 63/343,467, filed on May 18, 2022.

(51) Int. Cl.
*G06T 1/20* (2006.01)
*G06T 17/10* (2006.01)

(52) U.S. Cl.
CPC ............... *G06T 1/20* (2013.01); *G06T 17/10* (2013.01)

(58) Field of Classification Search
CPC ......... G06T 1/20; G06T 15/00; G06T 15/005; G06T 15/10; G06T 15/205; G06T 15/80; G06T 17/05; G06T 17/10; G06T 17/20; G06T 11/40
See application file for complete search history.

(56) References Cited

U.S. PATENT DOCUMENTS

| | | | |
|---|---|---|---|
| 5,251,296 A | 10/1993 | Rhoden et al. | |
| 5,371,519 A | 12/1994 | Fisher | |
| 5,533,170 A | 7/1996 | Teitzel et al. | |
| 5,886,701 A | 3/1999 | Chauvin et al. | |
| 6,058,405 A | 5/2000 | Kolte et al. | |
| 6,222,550 B1 | 4/2001 | Rosman et al. | |
| 6,229,553 B1 | 5/2001 | Duluk, Jr. et al. | |
| 6,344,852 B1 | 2/2002 | Zhu et al. | |
| 6,437,780 B1 | 8/2002 | Baltaretu et al. | |
| 6,784,884 B1 | 8/2004 | Hsieh | |
| 6,789,421 B2 | 9/2004 | Baldwin | |
| 7,170,515 B1 | 1/2007 | Zhu | |
| 7,224,364 B1 | 5/2007 | Yue et al. | |
| 8,502,829 B2 | 8/2013 | Howson | |
| 9,090,943 B2 | 7/2015 | Levy et al. | |
| 10,991,152 B2 * | 4/2021 | He | G06T 15/80 |
| 11,972,518 B2 * | 4/2024 | Tuomi | G06T 1/20 |
| 2003/0043171 A1 | 3/2003 | Fliflet | |

(Continued)

FOREIGN PATENT DOCUMENTS

| | | |
|---|---|---|
| JP | 2003-515798 T2 | 5/2003 |
| JP | 2008-520021 T2 | 6/2008 |
| WO | 2001/37220 A1 | 5/2001 |

*Primary Examiner* — Vijay Shankar
(74) *Attorney, Agent, or Firm* — Volpe Koenig (57) ABSTRACT

A technique for rendering is provided. The technique includes for a set of primitives processed in a coarse binning pass, outputting early draw data to an early draw buffer; while processing the set of primitives in the coarse binning pass, processing the early draw data in a fine binning pass; and processing remaining primitives of the set of primitives in the fine binning pass.

20 Claims, 9 Drawing Sheets

(56) References Cited

U.S. PATENT DOCUMENTS

| | | |
|---|---|---|
| 2003/0058244 A1 | 3/2003 | Ramani et al. |
| 2003/0122815 A1 | 7/2003 | Deering |
| 2003/0122819 A1 | 7/2003 | Koneru et al. |
| 2003/0174133 A1 | 9/2003 | Shehane et al. |
| 2004/0183807 A1 | 9/2004 | Emberling et al. |
| 2004/0196283 A1 | 10/2004 | Lewis et al. |
| 2007/0146378 A1 | 6/2007 | Sorgard et al. |
| 2007/0165035 A1 | 7/2007 | Duluk, Jr. et al. |
| 2007/0296725 A1 | 12/2007 | Steiner et al. |
| 2008/0100627 A1 | 5/2008 | Nystad et al. |
| 2008/0259076 A1 | 10/2008 | Meinds |
| 2010/0177105 A1 | 7/2010 | Nystad et al. |
| 2011/0148901 A1 | 6/2011 | Adams et al. |
| 2011/0216069 A1 | 9/2011 | Keall et al. |
| 2012/0280992 A1 | 11/2012 | Shebanow et al. |
| 2013/0002663 A1 | 1/2013 | Howson |
| 2013/0113799 A1 | 5/2013 | Woo et al. |
| 2013/0229414 A1 | 9/2013 | Gruber |
| 2013/0271465 A1 | 10/2013 | Clarberg et al. |
| 2013/0293544 A1 | 11/2013 | Schreyer et al. |
| 2014/0118364 A1 | 5/2014 | Hakura et al. |
| 2014/0118380 A1 | 5/2014 | Hakura et al. |
| 2014/0139534 A1 | 5/2014 | Tapply et al. |
| 2014/0237187 A1 | 8/2014 | Dimitrov et al. |
| 2014/0267259 A1 | 9/2014 | Frascati et al. |
| 2015/0097857 A1 | 4/2015 | Akenine-Moller et al. |
| 2015/0145873 A1 | 5/2015 | Akenine-Moller et al. |
| 2015/0170407 A1 | 6/2015 | Redshaw |
| 2015/0325037 A1 | 11/2015 | Lentz et al. |
| 2017/0132834 A1 | 5/2017 | He et al. |
| 2017/0213313 A1 | 7/2017 | Hakura |
| 2018/0082399 A1 | 3/2018 | Martin et al. |
| 2019/0122417 A1 | 4/2019 | Mantor et al. |
| 2021/0225060 A1 | 7/2021 | Tuomi et al. |
| 2021/0287418 A1 | 9/2021 | Acharya et al. |

\* cited by examiner

PIPELINE DELAY ELIMINATION WITH PARALLEL TWO LEVEL PRIMITIVE BATCH BINNING

CROSS-REFERENCE TO RELATED APPLICATIONS

This application claims the benefit of U.S. Provisional application No. 63/343,467, entitled "PIPELINE DELAY ELIMINATION WITH PARALLEL TWO LEVEL PRIMITIVE BATCH BINNING," filed on May 18, 2022, the entirety of which is hereby incorporated herein by reference.

BACKGROUND

Hardware-accelerated three-dimensional graphics processing is a technology that has been developed for decades. In general, this technology identifies colors for screen pixels to display geometry specified in a three-dimensional coordinate space. Improvements in graphics processing technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for rendering is provided. The technique includes for a set of primitives processed in a coarse binning pass, outputting early draw data to an early draw buffer; while processing the set of primitives in the coarse binning pass, processing the early draw data in a fine binning pass; and processing remaining primitives of the set of primitives in the fine binning pass.

Figure 1:
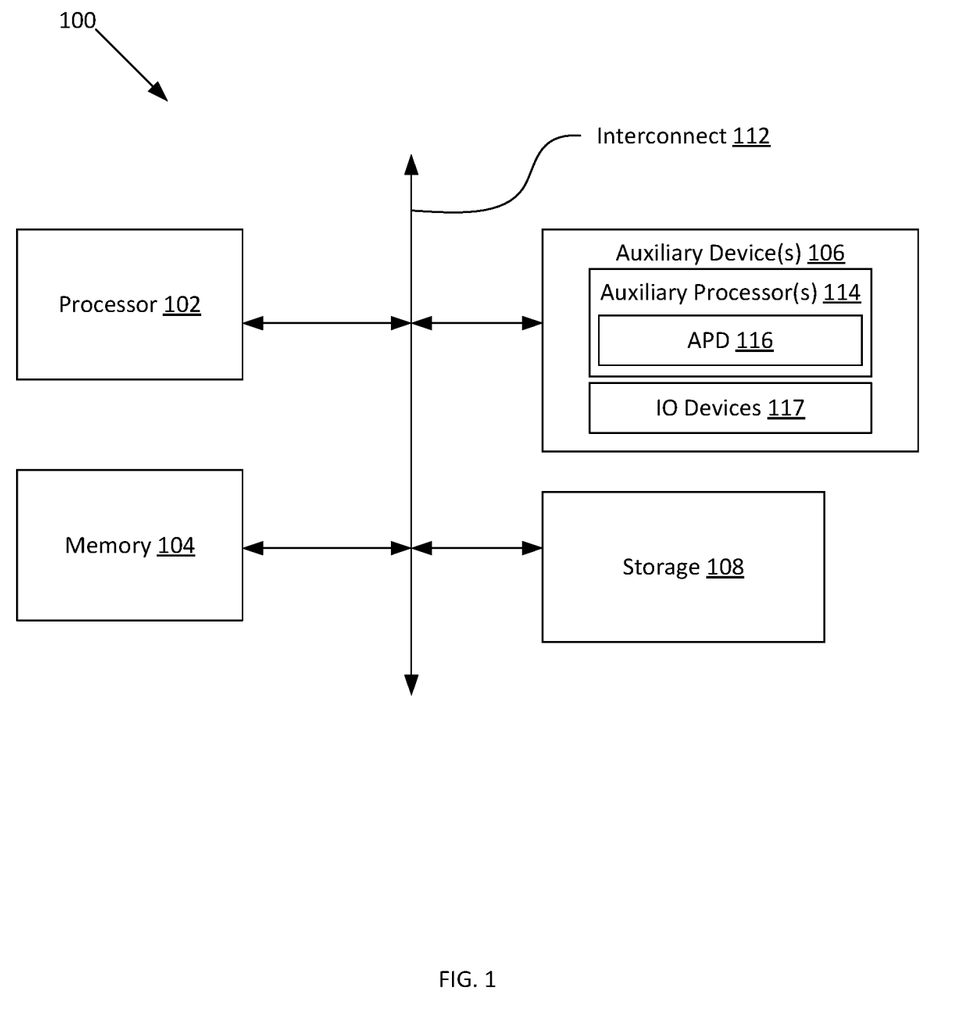
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
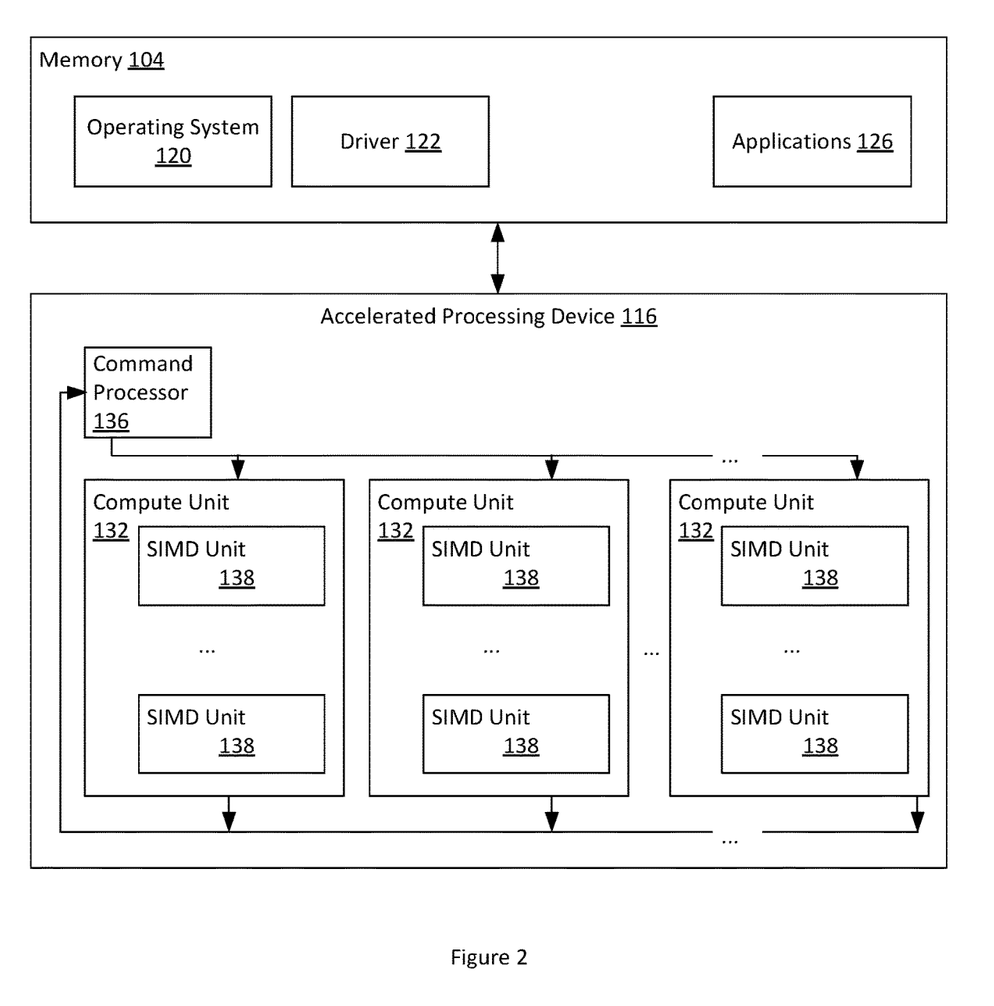
FIG. 2 illustrates details of the device of FIG. 1, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. A command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
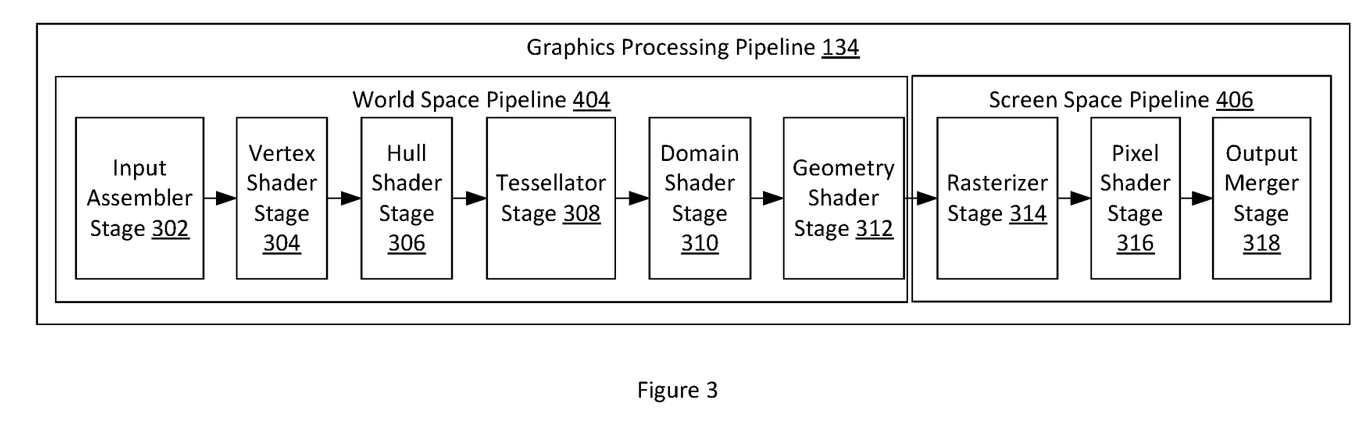
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Figure 4:
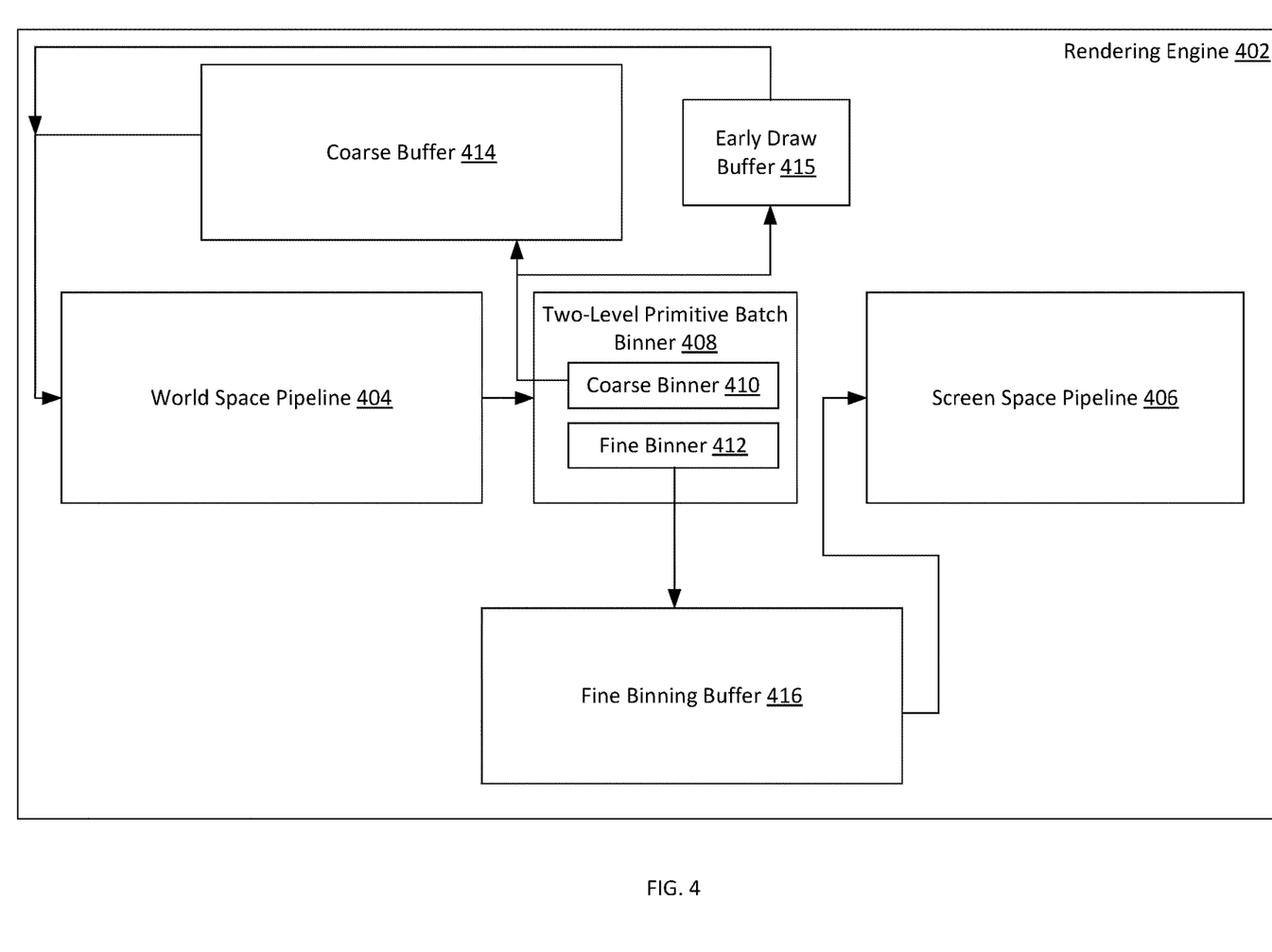
FIG. 4 illustrates additional details for the graphics processing pipeline.

The graphics processing pipeline 134 is divided into a world-space pipeline 404 and a screen-space pipeline 406. The world-space pipeline 404 converts geometry in world-space into triangles in screen space. The world-space pipeline 404 includes at least the vertex shader stage 304 (which transforms the coordinates of triangles from world-space coordinates to screen-space coordinates plus depth). In some examples, the world-space pipeline 404 also includes one or more of the input assembler stage 302, the hull shader stage 306, the tessellator stage 308, the domain shader stage 310, and the geometry shader stage 312. In some examples, the world-space pipeline 404 also includes one or more other elements not illustrated or described herein. The screen-space pipeline 406 generates colors for pixels of a render target (e.g., a screen buffer for display on a screen) based on the triangles in screen space. The screen-space pipeline 406 includes at least the rasterizer stage 314, the pixel shader stage 316, and the output merger stage 318, and also, in some implementations, includes one or more other elements not illustrated or described herein.

FIG. 4 illustrates a rendering engine 402 that includes a two-level primitive batch binner 408. The two-level primitive batch binner 408 performs binning on two levels: a coarse level and a fine level. In general, binning means collecting geometry information into a buffer and "replaying" that information in tile order. For coarse binning, ordering is performed with respect to coarse tiles and for fine binning, ordering is performed with respect to fine tiles. Replaying that information in tile order means sending the information in the buffer that overlaps a first tile to a portion of the rendering engine 402 for rendering, then sending the information in the buffer that overlaps a second tile to the portion for rendering, and so on.

Binning in this manner gains benefits related to temporal and spatial cache locality. More specifically, by "reordering" work to be rendered on a tile-by-tile basis, work that is close together will be performed together, meaning that accesses to memory that is spatially close together will be performed close together in time, which increases the likelihood that information fetched into a cache for the rendering engine 402 will be reused before being evicted, which reduces the overall number of misses, improves performance, reduces bandwidth in accesses to external memory, and reduces power consumption as a result.

In various examples, the amount of work that is collected into the buffer is dependent on the size of the buffer, the type of work that is collected into the buffer, and the timing (e.g., relative to the beginning and/or end of the frame, or relative to some other timing aspect) of the work collected into the buffer. In some examples, the buffer collects geometry until the buffer is full and then replays the contents of the buffer.

In general, two-level binning occurs in the following manner. A coarse binner 410 orders geometry output from the world space pipeline 404 into coarse bins. Each coarse bin includes geometry that overlaps a portion of screen space associated with that coarse bin. The coarse bins are larger than the fine bins for which fine binning occurs. The coarse bins are stored in the coarse buffer 414. The coarse buffer 414 replays the geometry to the world-space pipeline 404 in coarse bin order. The fine binner 412 stores the geometry into fine bins in the fine binning buffer 416. The fine binning buffer 416 then replays the fine bins in fine bin order. The fine bins are smaller than the coarse bins.

Because the coordinates of geometry is in world space at the beginning of the world-space pipeline 404, the first level of binning includes processing the geometry through the world-space pipeline 404 to convert such geometry into screen space. Note that in this first level of binning, it is not necessary for the geometry to proceed to the screen-space pipeline 406, since the purpose of coarse binning is to increase the locality of geometry fed to the second level of binning (the fine binning). (Note however that in at least some implementations, information from the first tile of the first level of binning proceeds to the screen space pipeline for further processing in the second level of binning.).

In some examples, in addition to storing, into the coarse buffer 414, information regarding which coarse bins the geometry falls within, the coarse binner 410 also stores information into the coarse buffer 414 in a manner that indicates or is associated with visibility testing performed in the world space pipeline 404. More specifically, the world-space pipeline 404 performs certain tests to determine whether geometry is visible. Such tests include backface culling, which removes triangles whose back face is facing the camera (and is thus invisible), and, optionally, other forms of culling. The coarse binner 410 does not store information related to geometry into the coarse buffer 414 if that geometry is determined to be culled by the world-space pipeline 404 in the coarse binning pass. In addition, the world-space pipeline 404 performs clipping. Clipping clips portions of geometry that fall outside of the viewport. In some examples, for triangles that are clipped, the world-space pipeline 404 converts such triangles into new triangles that occupy the space of the clipped triangle.

In sum, the coarse binner 410 performs coarse binning that includes at least two operations: the coarse binner 410 categorizes geometry processed through the world-space pipeline 404 as overlapping one or more individual coarse bins; and the coarse binner 410 stores the geometry in a way that indicates visibility information. Stated differently, in addition to organizing the coarse tiles, the coarse binner 410 may also store data indicating which triangles are culled (e.g., by culling operations of the world space pipeline 404 such as frustum culling, back-face culling, or other culling operations), or may omit the triangles that are culled. The coarse binner 410 may store the sorted geometry in the coarse buffer 414 as draw calls, as sets of primitives defined with vertex indices and other associated data, or as compressed data that represents the geometry of a draw call or set of primitives, including whether the primitives in that geometry is culled. A draw call is an input to the rendering engine 402 that provides geometry such as vertices and requests rendering of that geometry. The term "call" refers to the fact that a draw call is a function in a graphics application programming interface ("API") made available to software, such as software executing on a central processing unit.

The purpose of the coarse level of binning is to enhance the ability of the fine binning operations to group together geometry. More specifically, when a coarse tile is being replayed for the fine binning pass, the coarse level tile restricts geometry sent to the fine binner 412 to a coarse tile, which increases the amount of geometry in any particular fine binning tile. By including geometry restricted to a particular area of the render target (a coarse tile), fewer fine tiles will be involved in the fine binning operations, and more geometry will be within those fine tiles. This increased "crowding" improves the benefits obtained through fine binning, since more data is involved in the cache locality enhancements of fine binning.

Figure 5:
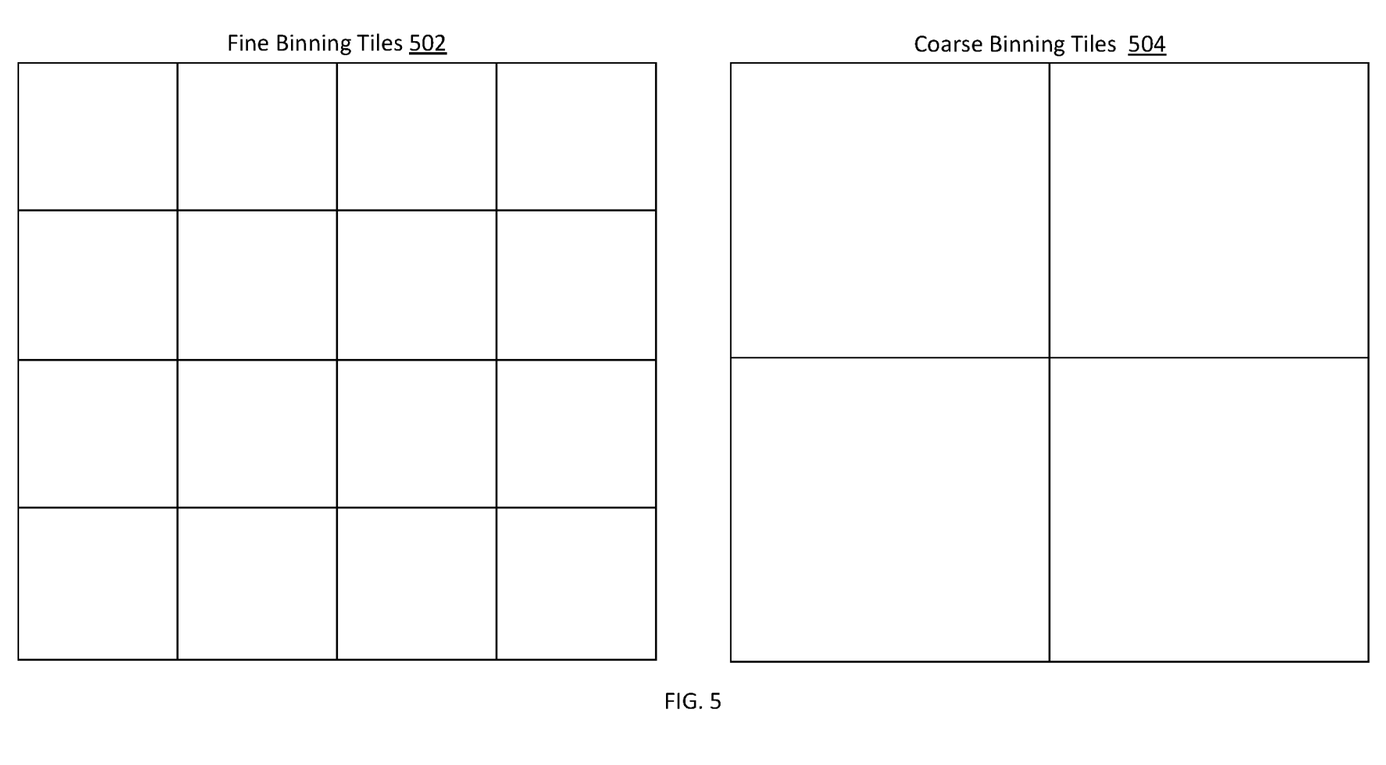
FIG. 5 illustrates screen subdivisions for binning operations.

FIG. 5 illustrates fine binning tiles 502 and coarse binning tiles 504. The fine binning tiles 502 illustrate the size of the tiles that the fine binner 412 organizes geometry into. The coarse binning tiles 504 illustrate the size of the tiles that the coarse binner 410 organizes geometry into. The coarse binning tiles 504 are larger than the fine binning tiles 502.

More specifically, the coarse binning tiles 504 represent the portions of the render target that the coarse binner 410 organizes geometry into. As stated above, the coarse binner 410 sorts geometry based on which coarse tile the geometry overlaps. The coarse binning tiles 504 are the tiles upon which this sorting is based.

Similarly, the fine binning tiles 502 are the portions of the render target that the fine binner 412 organizes geometry into. The fine binner 412 sorts incoming geometry based on which fine binning tile 502 the geometry overlaps with.

Figure 6:
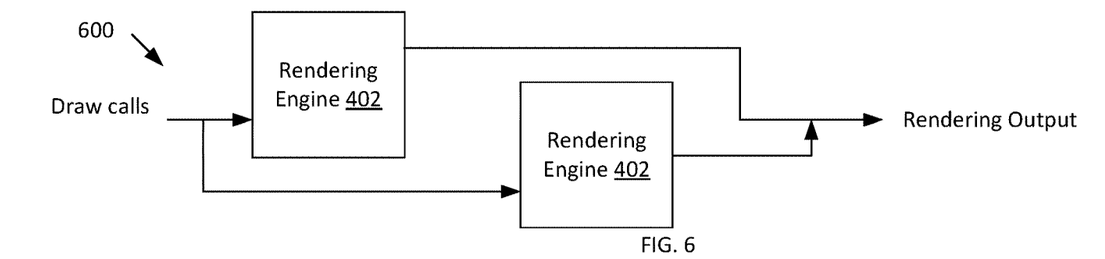
FIG. 6 illustrates parallel rendering operations.
Figure 7:
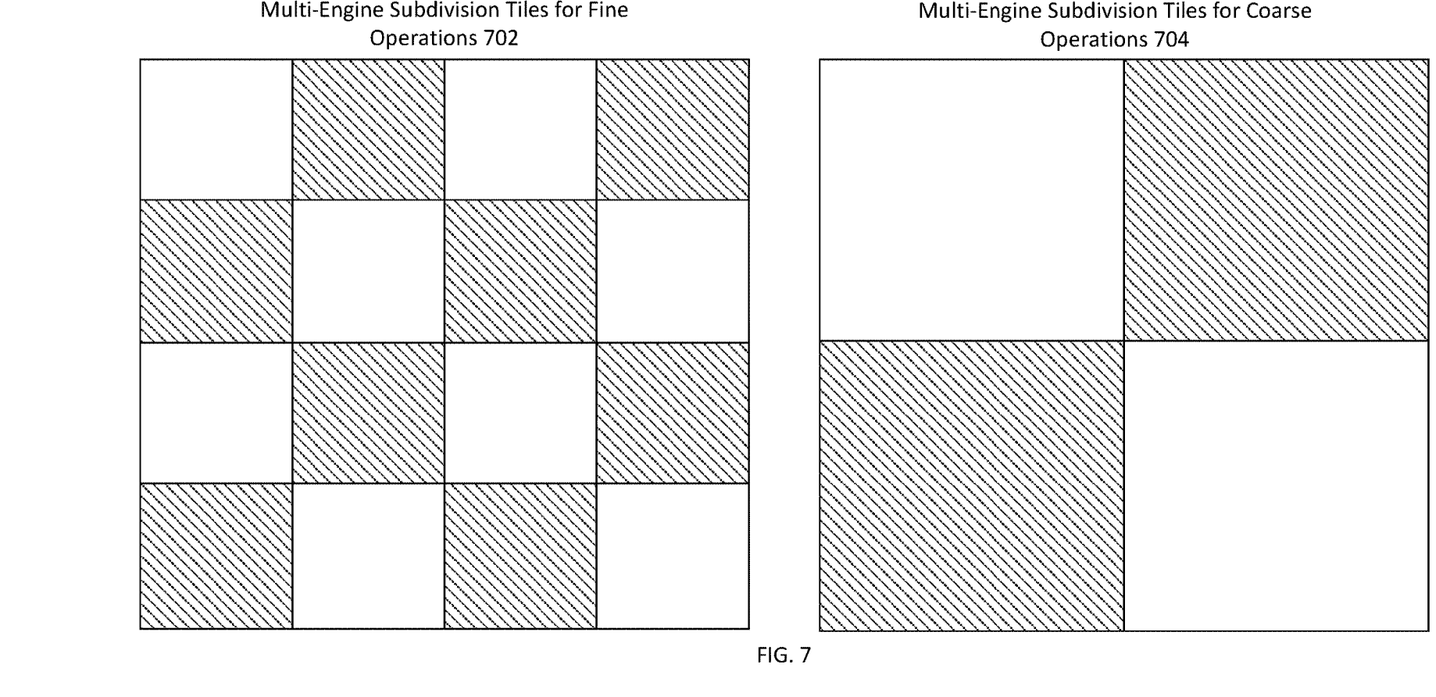
FIG. 7 illustrates sub-divisions for parallel rendering.

FIG. 6 and FIG. 7 will now be discussed together. FIG. 6 illustrates a parallel rendering system 600, according to an example. FIG. 7 illustrates subdivisions of a render target according to an example. The parallel rendering system 600 includes multiple rendering engines 402. The render target is divided into multi-engine subdivision tiles for fine operations 702 and multi-engine subdivision tiles for coarse operations 704. The multi-engine subdivision tiles for fine operations 702 are sometimes referred to herein as "fine subdivisions 702" and the multi-engine subdivision tiles for coarse operations 704 are sometimes referred to herein as "coarse subdivisions 704."

These rendering engines 402 operate in parallel by operating on parallel rendering tiles of the render target. The rendering engines 402 generate data for different sets of parallel rendering tiles on different rendering engines 402. More specifically, each rendering engine 402 is assigned a different set of tiles. Each rendering engine 402 operates on the set of tiles assigned to that rendering engine 402 and not on tiles assigned to other rendering engines 402.

The manner in which data is subdivided between multiple parallel rendering engines 402 is different for the coarse binning operations as compared with the screen-space pipeline operations. More specifically, the geometry data is subdivided according to coarse subdivisions 704 for the coarse binning operations and the geometry data is subdivided according to fine subdivisions 702 for the screen-space operations.

Subdividing the geometry according to subdivisions means that one rendering engine 402 performs operations for one set of subdivisions and another rendering engine 402 performs operations for a different set of subdivisions. In the example illustrated, the top rendering engine 402 performs operations for the solid, un-shaded subdivisions and the bottom rendering engine 402 performs operations for the diagonally shaded subdivisions. Regarding coarse binning operations, each rendering engine of a plurality of rendering engines 402 performs coarse binning operations for the multi-engine subdivision tiles for coarse operations 704 that are assigned to that rendering engine 402 and not for the multi-engine subdivision tiles for coarse operations 704 that are assigned to any other rendering engine 402. Regarding fine binning operations, each rendering engine 402 of a plurality of rendering engines 402 performs fine binning operations for the multi-engine subdivision tiles for fine operations 702 assigned to that rendering engine 402 but not for the multi-engine subdivision tiles for fine operations 702 assigned to other rendering engines 402. In an example, a first rendering engine 402 performs operations for the solid coarse subdivisions 704 and not the shaded coarse subdivisions 704 and a second rendering engine 402 performs operations for the shaded coarse subdivisions and not the solid coarse subdivisions 704. In this example, the first rendering engine 402 performs operations for the shaded fine subdivisions 702 and not for the solid fine subdivisions 702 and the second rendering engine 402 performs operations for the solid fine subdivisions 702 and not for the shaded fine subdivisions 702.

A rendering engine 402 performing operations according to a coarse subdivision means that, for the subdivisions assigned to a particular rendering engine 402, that rendering engine 402 determines which geometry in the world-space pipeline overlaps the coarse binning tiles 504 assigned to that rasterization engine 402. In other words, each rendering engine 402 operates on geometry that overlaps the coarse subdivision tiles 704 and determines which coarse binning tiles 504 such geometry overlaps. In addition, in implementations where the coarse binners 410 record information in a way that indicates which primitives are culled or clipped into the coarse buffer 414, each rendering engine 402 records that information for the primitives that overlap the coarse binning subdivisions 704 assigned to that rendering engine 402. Recording such information means recording "implicit" culling information, "explicit" culling information, or a combination of implicit and explicit culling information. Explicit culling information is recorded data that indicates which primitives are culled or clipped and how the primitives are clipped. Implicit culling information means information that is not explicitly indicated but that nonetheless indicates what is culled or clipped. In an example, primitives that were processed in the coarse binning operations (e.g., processing through the world-space pipeline 404 and coarse binner 410) and are determined to be culled are not included in the coarse buffer 414. Similarly, primitives that were determined to be clipped in the coarse binning operations are included as clipped primitives. The operations performed for coarse binning are sometimes referred to herein as a "coarse binning pass."

Note that when the rendering engines 402 first receive primitives for the coarse binning operations, the rendering engines 402 may not know which coarse subdivision 704 each primitive overlaps. Thus, in some implementations, the rendering engines 402 process all received primitives through the world-space pipeline 404, which transforms the primitive coordinates into screen space. After this occurs, the coarse binner 410 of a rendering engine 402 stores primitives into the coarse buffer 414 that overlap the coarse subdivision 704 associated with that rendering engine 402, does not store primitives into the coarse buffer 414 that do not overlap any coarse subdivision 704 associated with that rendering engine 402. Thus, after the coarse binning operation, a rendering engine 402 stores primitives that overlap the coarse subdivisions 704 assigned to that rendering engine 402 but does not store primitives that do not overlap any coarse subdivision 704 assigned to that rendering engine 402.

With the primitives stored in the coarse buffer 414, the coarse binner 410 transmits those primitives to the world space pipeline 404 in a second pass, in which fine binning operations occur (a "fine binning pass"). In the fine binning pass, the world space pipeline 404 processes the received geometry normally, the fine binner 412 transmits the primitives in fine binning tile order to the screen-space pipeline 406, and the screen-space pipeline 406 processes the received geometry.

A rendering engine 402 performing operations for multi-engine subdivision tiles for fine operations 702 in the following manner. Each rendering engine 402 is assigned a particular set of multi-engine subdivision tiles for fine operations 702 ("fine subdivisions 702"). The fine binner 412 for each rendering engine 402 thus operations on geometry received from the world space pipeline 404 that overlaps the associated subdivisions 702 and does not perform operations on geometry received from the world space pipeline 404 that does not overlap the associated subdivisions 702. Note that it is possible for the coarse subdivisions 704 to have different sizes than the fine subdivisions 702. Thus, it is possible that a rendering engine 402 performs coarse binning operations for geometry that does not overlap the fine subdivisions 702 associated with that rendering engine 402. In that situation, in the fine binning pass, the rendering engine 402 does not process that geometry in the screen space pipeline 406. However, in the fine binning pass, for a rendering engine 402, the fine binner 412 and screen-space pipeline 406 do operate on geometry that overlaps the fine subdivisions associated with that rendering engine 402. Thus, a rendering engine 402 performs fine binning operations and screen-space pipeline 406 operations for geometry that overlaps the associated fine subdivisions 702.

During execution of fine binning operations (the fine binning pass) in a rendering engine 402, the primitives are provided to the world-space pipeline 404 in an order determined by the coarse binner 410. After processing in the world-space pipeline 404, the fine binner 412 reorders those primitives in fine-binning tile order (that is, in the order of the fine binning tiles 502). In other words, the fine binner 412 "replays" or feeds primitives to the screen-space pipeline 406 in the order of the fine binning tiles 502. For example, the fine binner 412 stores primitives into the fine binning buffer 416 and, subsequently, sends the primitives from that buffer 416 that overlap one fine binning tile 502 to the screen space pipeline 406, and then the primitives from that buffer 416 that overlap another fine binning tile 502 to the screen space pipeline 406, and so on.

In the above descriptions, two types of tiles are described: binning tiles (502 and 504) and subdivision tiles (702 and 704). The binning tiles are the tiles that determine how a rendering engine 402 reorders work for processing. The subdivision tiles are the tiles that indicate how the geometry is divided for processing between the parallel rendering engine 402.

It is possible for fine binning tiles 502 to have the same or different size as the fine subdivisions 702, and for the coarse binning tiles 504 to have the same or different size as the coarse subdivisions 704. However, benefit is gained in the situation where the size of the subdivisions for parallel processing for coarse binning operations is the same as the size of the coarse tiles used for coarse binning. In such instances, each rendering engine 402 is assigned a portion of the render target corresponding to a set of coarse bins. This is in contrast with a scheme in which the size of the parallel subdivisions between rendering engines 402 is different from the size of the coarse bins.

By utilizing the same size for the coarse tiles and the parallel subdivisions, the rendering engines 402 do not need to (and, in some implementations, do not) communicate relative API order of the primitives. More specifically, it is required that the rendering engines 402 render geometry according to "API" order, which is the order requested by the client of the rendering engines 402 (e.g., the CPU). If the sizes of the coarse tiles and the size of the parallel subdivision for coarse operations were different, then it could be possible for a rendering engine 402 to be placing primitives into the coarse buffer 414 for the same coarse tile as a different rendering engine 402. To maintain API order, these rendering engines 402 would have to communicate about relative order, which could be expensive in terms of processing resources and could also result in lower performance due to the overhead of communication required to synchronize processing between the two rendering engines 402. By having the coarse tiles and parallel subdivision be the same size, no such communication needs to occur.

Figure 8:
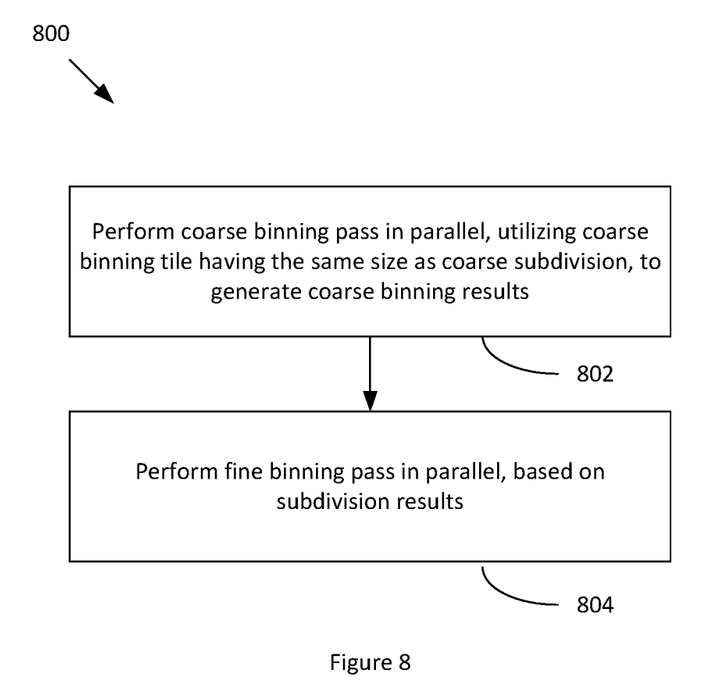
FIG. 8 is a flow diagram of a method for performing rendering operations, according to an example.

FIG. 8 is a flow diagram of a method 800 for performing rendering operations, according to an example. Although described with respect to the system of FIGS. 1-7, those of skill in the art will recognize that any system configured to perform the steps in any technically feasible order falls within the scope of the present disclosure.

At step 802, a first rendering engine 402 performs a coarse binning pass in parallel with a second rendering engine 402. Each rendering engine 402 utilizes a coarse binning tile size that is the same as a coarse subdivision 704 size, to generate coarse binning results.

As described elsewhere herein, the coarse binning tile size defines the size of the coarse binning tiles 504. The coarse binning tiles 504 are define how the rendering engines 402 perform coarse binning. Specifically, the rendering engines 402 order geometry based on the coarse binning tiles 504 such that the rendering engines 402 perform subsequent operations (e.g., the fine binning pass) first for one coarse binning tile 504 then for another coarse binning tile 504, and so on. The coarse subdivision 704 size defines the size of the coarse subdivisions 704 that indicate how work is divided between rendering engines 402. As stated elsewhere herein, for a particular rendering engine 402, the "replay" of the coarse binning data for the fine binning pass occurs for geometry that overlaps the coarse subdivisions 704 associated with that rendering engine 402 and not for geometry that does not overlap such coarse subdivisions 704. The size of the coarse binning tiles 504 being the same as the size of the coarse subdivisions 704 means that in the coarse binning pass, a rendering engine 402 places data into the coarse buffer 414 that will be used by that same rendering engine 402 in the fine binning pass.

At step 804, the first rendering engine 402 and second rendering engine 402 perform fine binning passes in parallel, based on the subdivision results. More specifically, each rendering engine 402 replays the coarse binned data in coarse bin order. In each rendering engine 402, the coarse binned data includes geometry that overlaps the coarse subdivisions assigned to that rendering engine 402 and does not include geometry that does not overlap the coarse subdivisions assigned to that rendering engine 402. This data is processed through the world-space pipeline 404 and the resulting screen-space geometry is provided to the fine binner 412. At the fine binner 412, each rendering engine 402 processes geometry assigned to the fine subdivisions 702 assigned to that rendering engine 402 and does not process geometry that does not overlap fine subdivisions 702 assigned to the rendering engine 402. The fine binner 412 orders the data based on the fine binning tiles 502, causing that data to be processed in order of fine binning tiles 502. For example, the fine binner 412 transmits to the screen space pipeline 406 geometry (e.g., all such geometry) from the fine binning buffer 416 that overlaps one fine binning tile 502, then transmits to the screen space pipeline 406 geometry (e.g., all such geometry) from the fine binning buffer 416 that overlaps another fine binning tile 502, and so on. The geometry transmitted by a rendering engine 402 in this manner is geometry that overlaps the fine subdivisions 702 assigned to that rendering engine 402 but does not include geometry that does not overlap such fine subdivisions 702.

Although a certain number of various elements are illustrated in the figures, such as two rendering engines 402, this disclosure contemplates implementations in which there are different numbers of such elements.

Figure 9:
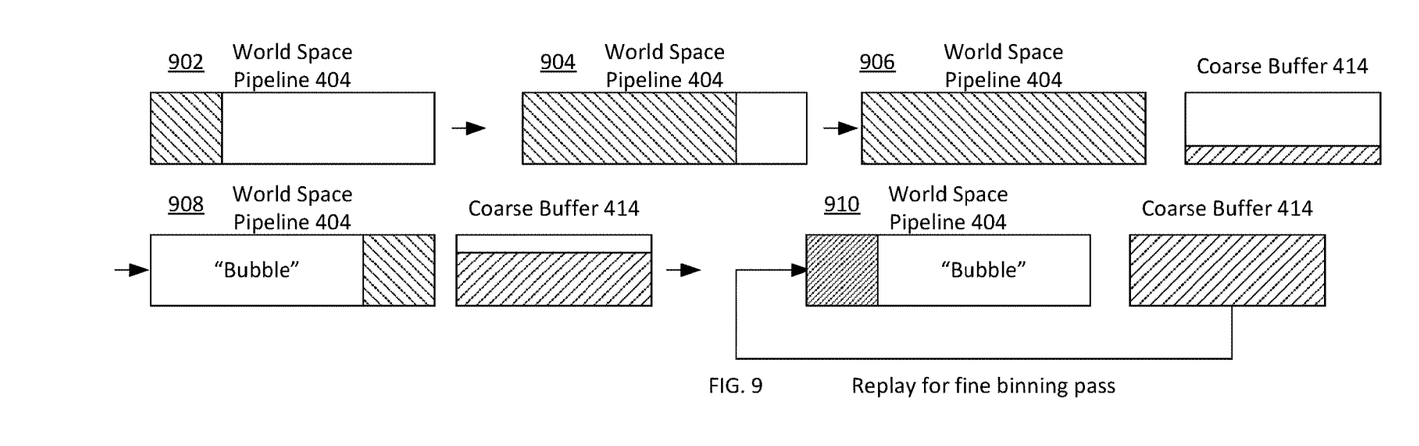
FIG. 9 illustrates operations that result in a "bubble" in the rendering pipeline.

FIG. 9 illustrates operations that introduce a "bubble" into the rendering engines 402 when two level primitive batch binning occurs. FIG. 9 shows a series of "steps" or "stages" 902-910 of a rendering engine 402. Time proceeds from left to right and top to bottom. The stages are separated by arrows.

The world-space pipeline 404 receives and processes work in step 902. As described above, the work includes primitives to render. Step 904 shows that work proceeding through the world-space pipeline 404. As can be seen, between step 902 and step 904, work consumes more of the world-space pipeline 404. This additional consumption illustrates that data has proceeded farther through the world-space pipeline 404 and/or that more hardware is occupied processing data for the world-space pipeline 404.

In step 906, the world-space pipeline 404 continues processing the work and writes data into the coarse buffer 414 indicating the coarse bin order of the primitives processed. It should be understood that at least some of the data introduced to the world-space pipeline 404 has reached the end of the world-space pipeline 404 (for example, has been processed by the vertex shader stage 304, has had culling and clipping applied, and has arrived at the coarse binner 410. At least some of the data illustrated at step 902 has been placed into the coarse buffer 414 at step 906.

In step 908, the world-space pipeline 404 continues processing the work and continues writing the results into the coarse buffer 414. In step 908, a bubble forms because the rendering engine 402 is unable at this stage to provide any data from the coarse buffer 414 to the world-space pipeline 404 in the fine binning pass. In some implementations, this inability to provide data to the world-space pipeline 404 in the fine binning pass is because the data in the world-space pipeline 404 is in a compressed and/or encoded format, and the entirety of the data is necessary to decode that data. This compression and/or encoding is used to reduce the amount of data that must be stored for replay for the fine binning pass. More specifically, the coarse binning pass operates over a very large amount of geometry. Encoding and/or compressing that geometry, rather than storing that geometry as raw data, allows the coarse buffer 414 to have a relatively small size. Once the data is fully written to the coarse buffer 414, the coarse binner 410 is able to decode and/or decompress that data, and replays that data to the world-space pipeline 404 for the fine binning pass. Thus in step 910, the world-space pipeline 404 starts processing the data for the fine binning pass. It can be seen that the need to decode and/or decompress the data in the coarse buffer 414 results in a bubble in the pipeline between the coarse binning pass and the fine binning pass.

Figure 10:
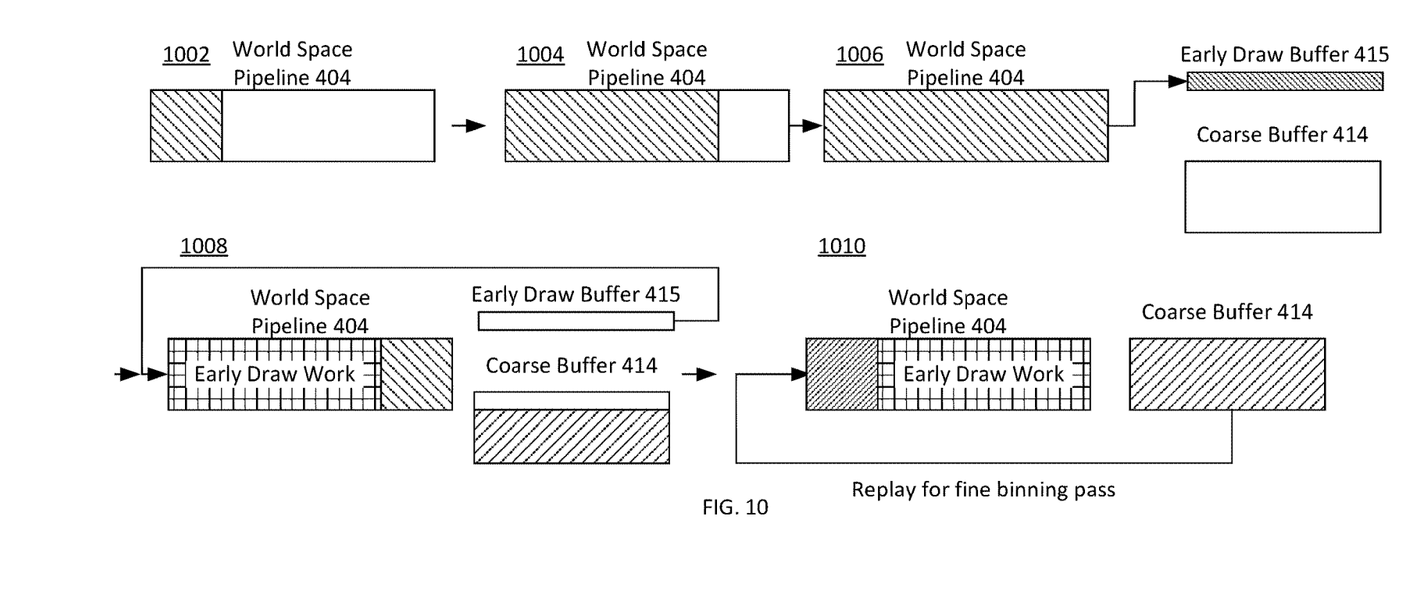
FIG. 10 illustrates operations that avoid the bubble of FIG. 9.

FIG. 10 illustrates operations for eliminating or reducing the bubble described with respect to FIG. 9. Steps 1002 and 1004 illustrate the coarse binning work proceeding through the pipeline. These steps are similar to steps 902 and 904 of FIG. 9.

In step 1006, the coarse binner 410 writes early draw data to an early draw buffer 415. The early draw data includes work that can be decoded and/or decompressed separately from the remainder of the results from the coarse binning pass so that the world-space pipeline 404 is able to begin working on the fine binning pass before completing all of the work for the coarse binning pass. In other words, the early draw data is stored and/or compressed in a way such that, once all early draw data is received in the early draw buffer 415, that data is capable of being decompressed and/or decoded and provided to the world-space pipeline 404 for processing in the fine binning pass, without any of the other data from the coarse binning pass.

In some examples, the early draw data is written into an early draw buffer 415 that is separate from the coarse buffer 414. In some examples, the early draw buffer 415 is a part of the coarse buffer 414. In some examples, the early draw data includes data for the earliest primitives in API order that overlap the first coarse bin (or the first set of more than one coarse bins) that is to be processed in the fine binning pass. Because data is processed in coarse bin order and in API order within each coarse bin, processing the data for the earliest primitives in API order that overlap the first coarse bin(s) to be processed in the fine binning pass allows the coarse binner 410 to start the remainder of the coarse binning results (that is, the results other than the early draw data) just after those primitives in API order. In other words, storing the "earliest" primitives in the early draw buffer 415 allows work to proceed in the fine binning pass while the remainder of the work for the coarse binning pass is being written to the coarse buffer 414. In some implementations, the coarse binner 410 or the driver 122 dynamically determines the amount of early draw data that is to be stored. In other examples, the amount of early draw data to be stored is fixed.

At step 1008, the coarse binner 410 has provided the early draw data to the world space pipeline 404 for the fine binning pass. More specifically, between steps 1006 and 1008, the coarse binner 410 provides the early draw data to the world space pipeline 404 and the world-space pipeline 404 performs this work as part of the fine binning pass. In addition, the world-space pipeline 404 is still processing some work from the coarse binning pass (illustrated with diagonal shading). There is no bubble because the coarse binner 410 is able to provide data for the fine binning pass before completing the coarse binning pass. More specifically, unlike in FIG. 9, where the coarse binner 410 must wait until all data has been received in the coarse buffer 414 before the fine binning step can proceed, the self-contained data in the early draw buffer 415 allows the coarse binner 410 to proceed with the fine binning pass using that data. Then, once all of the data from the coarse binner 410 has been placed into the coarse buffer 414, the coarse binner 410 transmits that data to the world-space pipeline 404 for processing in the fine binning pass. Thus, at step 1010, the coarse binner 410 has provided work subsequent to the early draw data for the fine binning pass to the world space pipeline 404 and the world space pipeline 404 is processing that data, along with the early draw data, for the fine binning pass.

In some examples, the coarse binner 410 includes guard tokens into the early draw data that indicates to the coarse binner 410 that the coarse binner 410 is allowed to proceed past the early draw data for the fine binning pass. More specifically, once the coarse binner 410 has written out the entirety of the coarse binning pass results to the coarse buffer 414, the coarse binner 410 writes that token into the early draw buffer 415. This token indicates to the coarse binner 410 that the coarse binner 410 is allowed to process a portion of the data in the coarse buffer 414 as determined by the guard token. In other words, once the coarse binner 410 has consumed the data in the early draw buffer 415, the coarse binner 410 obtains the guard token from the early draw buffer 415. Because the guard token is inserted into the early draw buffer 415 when the coarse binner 410 has placed all data associated with the guard token (for example, a guard token may indicate which data in the coarse binner 410 is associated with that guard token) for the coarse binning pass in the coarse buffer 414, the coarse binner 410 is permitted to proceed to the data in the coarse buffer 414 from the data in the early draw buffer 415 once the guard token has been placed into the early draw buffer 415. In other words, the guard token indicates that data subsequent to the guard token is ready to be processed in the fine binning pass. In some examples, the guard token is placed after the early draw data in the early draw buffer 415 so that while the coarse binner 410 is reading the early draw data, when the coarse binner 414 encounters the guard token, the coarse binner 410 determines that the coarse binner 410 is permitted to proceed to the data in the coarse buffer 414.

In some examples, the coarse binner 410 also writes a start early draw data token into the early draw buffer 415, which indicates that the data after that token is early draw data. Although it is stated that the coarse binner 410 provides work from the coarse buffer 414 or early draw buffer 415, in some examples, another element, such as the command processor 136 or a different element, transmits work to the world space pipeline 404 based on the data in the early draw buffer 415 and coarse buffer 414. In some examples, the amount of data in the early draw buffer 415 is tuned (e.g., by the coarse binner 410) to hide the latency for proceeding past the early draw data.

In some examples, the coarse binner 410 provides work from the first coarse bin (or from a set of more than one first coarse bins) to the screen-space pipeline 406 for processing, while still in the coarse binning pass. More specifically, the reason that the coarse binner 410 cannot provide data for all bins to the screen-space pipeline without sending that data through the world-space pipeline 404 is due to the amount of such data and the size of a buffer that would be needed to buffer all such data for reorganization by coarse tile. However, the coarse binner 410 is able to provide data for at least a first coarse bin without buffering such data because performing that action is simply a filter. More specifically, the coarse binner 410 is able to simply transmit all primitives that overlap the first coarse bin to the screen space pipeline 406 for processing without buffering that data. In some examples, the data for this first coarse bin does not pass through the coarse binner 410 and instead bypasses the coarse binner 410. Thus, in some implementations, the early draw data is from a bin subsequent to the first bin, after the bin that is transmitted to the screen space pipeline 406 for rendering while the coarse binning pass is still occurring. It is not necessary for the early draw data to include all primitives in a particular bin.

In some examples, the early draw data and the data stored in the coarse buffer 414 is embodied as references to primitives within draw calls. A draw call is a request from a client of the APD 116 to draw certain geometry. Draw calls typically specify one or more primitives to be drawn. A draw call index combined with a primitive index thus uniquely specifies any particular primitive. In another example, a draw call index combined with an index stream that specifies several primitives within the draw call are stored in a compressed or uncompressed manner and encoded or unencoded manner. The early draw data and the data in the coarse buffer 414 thus stores these indices for primitives that are to be replayed in the fine binning pass. In some examples, the early draw data does not include information for coarse bins or draw calls that do not include visible primitives. However, the data is kept in API order and coarse bin order for rendering correctness.

Figure 11:
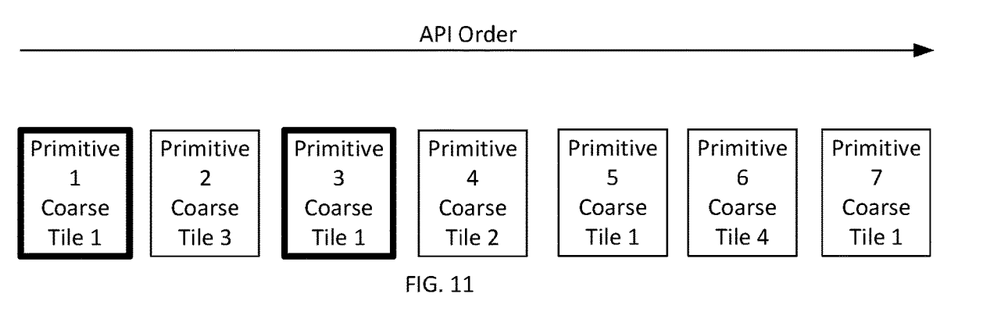
FIG. 11 illustrates rendering operations for early draw data introduced to avoid the bubble of FIG. 9.

FIG. 11 illustrates a stream of primitives, illustrating the primitive that would be included in early draw data according to an example. The number of primitives illustrated is small for clarity of explanation, but it should be understood that an implementation can include a larger number of primitives. The bolded primitives (primitive 1 and primitive 3) are included within the early draw data because those primitives overlap tile 1. However, in this example, the early draw data is limited to two primitives, so the other primitives that overlap tile 1 are not included in the early draw data. Primitive 2 is not included in the early draw data because primitive 2 does not overlap tile 1.

Regarding work for parallel rendering engines, as shown in FIG. 7, the division of work between rendering engines 402 in the fine rendering pass (reference number 702) is finer than the division for the coarse rendering pass. Thus, multiple rendering engines 402 are able to process data for a single coarse bin for the early draw data.

Figure 12:
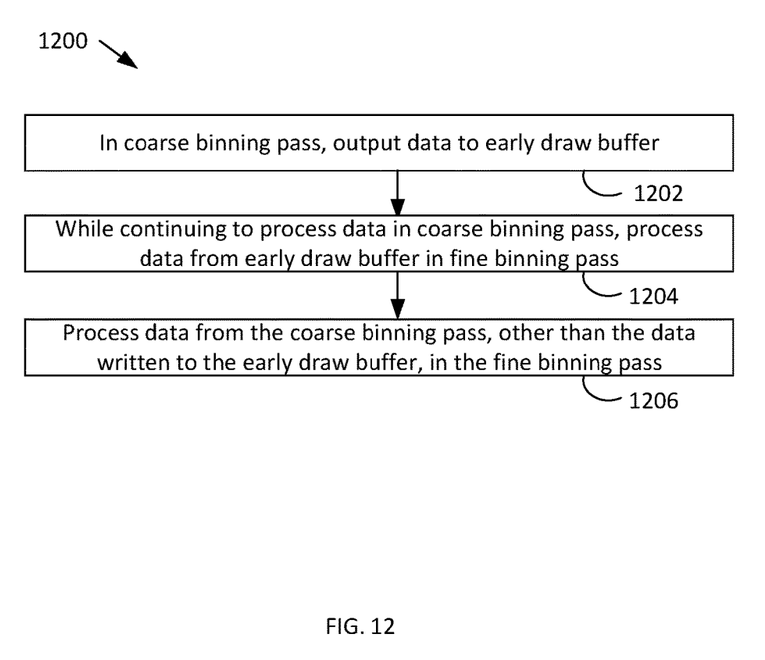
FIG. 12 is a flow diagram of a method for rendering according to a two-level primitive batch binning technique, according to an example.

FIG. 12 is a flow diagram of a method 1200 for rendering according to a two-level primitive batch binning technique, according to an example. Although described with respect to the system of FIGS. 1-11, those of skill in the art will understand that any system, configured to perform the steps of the method 1200 in any technically feasible order, falls within the scope of the present disclosure.

At step 1202, in a coarse binning pass, a coarse binner 410 outputs data to an early draw buffer 415. The coarse binning pass includes operations of a rendering engine 402 for determining which coarse binning tiles 504 geometry overlaps. More specifically, in the coarse binning pass, a rendering engine 402 receives a set of geometry. In this pass, the world-space pipeline 404 of the rendering engine 402 processes the geometry to determine a set of screen-space coordinates and outputs a set of early draw primitives to the early draw buffer 415. In some examples, the set of early draw primitives are the first set of primitives that would be processed by the fine binner 412 in the fine binning pass. More specifically, in some examples, the coarse binner 410 stores into the early draw buffer 415, the first set of primitives in API order that overlap the first coarse binning tile 504 to be processed in the fine binning pass. In some examples, the first coarse binning tile 504 to be processed in the fine binning pass is the top-left coarse binning tile 504. The early draw buffer 415 has a relatively limited size, and thus a relatively small number of the set of primitives processed in the coarse binning pass are stored in the early draw buffer 415.

In addition to the above, the data stored into the early draw buffer 415 is stored in such a way that, once all of the data is stored into the early draw buffer 415, that data can be read for replay in the fine binning pass, without additional data from the coarse binning pass. More specifically, the coarse buffer 414 stores the data for the fine binning pass in such a way that all such data (except the data in the early draw buffer 415) of a set of data processed in the coarse binning pass is necessary to read any of the data. For example, such data may be stored in an encoded format that requires a complete set of data to decode, and attempting to decode without all such data does not work properly. The early draw buffer 415 stores data in such a way that the remaining data of the set is not required to use the data in the early draw buffer 415. In other words, the early draw buffer 415 stores an independent set of data that can be used independently of the remaining data from the coarse binning pass, which allows work to proceed in the fine binning pass without a bubble as described with respect to FIGS. 9 and 10.

At step 1204, while continuing to process data in the coarse binning pass, the rendering engine 402 processes data from the early draw buffer 415 in the fine binning pass. As described above, the rendering engine 402 is able to obtain the data in the early draw buffer before all data from the coarse binning pass is written into the coarse buffer 414. Thus, at step 1204, while the world-space pipeline 404 is continuing to process data for the coarse binning pass, and/or while the coarse binner 410 is continuing to write the resulting data into the coarse buffer 414, the two-level primitive batch binner 408 "replays" the contents of the early draw buffer 415 for the fine binning pass. Thus, the two-level primitive batch binner 408 sends the primitives of the early draw buffer 415 to the world-space pipeline 404 for processing in a fine binning mode. In the fine binning pass, the world-space pipeline 404 processes the primitives received normally and transmits the resulting triangles of such processing to the two-level primitive batch binner 408. Then, the fine binner 412 determines which fine binning tiles 502 these resulting triangles overlap, stores information indicating such overlaps into the fine binning buffer 416, and causes the triangles to be provided to the screen space pipeline 406 for processing in the order of fine binning tiles 502. For example, the fine binner 412 causes the screen space pipeline 406 to process the primitives that overlap a first fine binning tile 502, and then to process the primitives that overlap a second fine binning tile 502, and so on.

At step 1206, the rendering engine 402 processes data from the coarse binning pass, other than the data in the early draw buffer 415, in the fine binning pass. The data processed in step 1206 includes the data written to the coarse buffer 414 after the data is written to the early draw buffer 415. As described with respect to FIG. 10, once the two level primitive batch binner 408 has replayed the contents of the early draw buffer 415 to the rendering engine 402 for a fine binning pass, the coarse binner 410 replays the contents of the coarse buffer 414 to the rendering engine 402 for a fine binning pass. As described above, in the fine binning pass, data is processed in the world space pipeline 404 and sent to the fine binner 412. The fine binner reorganizes the data by fine binning tile 502, placing the reorganized data in the fine binning buffer 416. The fine binning buffer 416 transmits the reorganized data to the screen space 406 in fine binning tile 502 order for processing.

In some examples, a token in the early draw buffer 415 indicates when the two level primitive batch binner 408 can proceed to transmitting the remaining data in the coarse binning buffer 414 to the rendering engine 402.

The various functional units illustrated in the figures and/or described herein (including, but not limited to, the processor 102, the auxiliary devices 106, the APD 116, the command processor 136, the graphics processing pipeline 134, the compute units 132, the SIMD units 138, each stage of the graphics processing pipeline 134 illustrated in FIG. 3, or the elements of the rendering engines 402, including the coarse buffer 414, fine binning buffer 416, the early draw buffer 415, coarse buffer 414, fine binning buffer 416, two-level primitive batch binner 408, coarse binner 410, and fine binner 412), may be implemented as a general purpose computer, a processor, a processor core, fixed function circuitry, analog circuitry, digital circuitry, other types of processors (such as field programmable gate arrays), any other technically feasible circuitry, as a program, software, or firmware, stored in a non-transitory computer readable medium or in another medium, executable by a general purpose computer, a processor, or a processor core, or as a combination of software executing on a processor and fixed function circuitry. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
a world-space pipeline;
a screen-space pipeline;
an early draw buffer; and
a two-level primitive batch binner configured to:
for a set of primitives processed through the world-space pipeline in a coarse binning pass, output early draw data to the early draw buffer;
while processing the set of primitives in the coarse binning pass, in the world-space pipeline, processing the early draw data in a fine binning pass though the world-space pipeline; and
processing remaining primitives of the set of primitives in the fine binning pass in the world-space pipeline and in the screen-space pipeline.

2. The system of claim 1, wherein outputting the early draw data comprises identifying early draw primitives of the set of primitives that overlap a first coarse binning tile and outputting the early draw primitives to the early draw buffer.

3. A system, comprising:
an early draw buffer; and
a two-level primitive batch binner configured to:
for a set of primitives processed through a world-space pipeline in a coarse binning pass, output early draw data to an early draw buffer;
while processing the set of primitives in the coarse binning pass, in the world-space pipeline, processing the early draw data in a fine binning pass through the world-space pipeline; and
processing remaining primitives of the set of primitives in the fine binning pass in the world-space pipeline and in a screen-space pipeline.

4. The system of claim 3, wherein outputting the early draw data comprises identifying early draw primitives of the set of primitives that overlap a first coarse binning tile and outputting the early draw primitives to the early draw buffer.

5. The system of claim 3, wherein processing the early draw data in the fine binning pass includes identifying which fine binning tiles are overlapped by the early draw data.

6. The system of claim 5, wherein the two-level primitive batch binner is further configured to process the early draw data in fine binning tile order.

7. The system of claim 3, wherein the two-level primitive batch binner is further configured to store a guard token in the early draw buffer that indicates the end of the early draw data.

8. The system of claim 7, wherein the two-level primitive batch binner is further configured to process the remaining primitives in the fine binning pass after detecting the guard token in the early draw buffer.

9. The system of claim 3, further comprising:
a plurality of rendering pipeline configured to perform the fine binning pass and the coarse binning pass concurrently.

10. The system of claim 3, wherein outputting the early draw data to the early draw buffer occurs in a manner that allows reading the early draw data without any other data from the coarse binning pass.

11. The system of claim 3, wherein reading cannot be performed for results of the coarse binning pass, other than the early draw data, when stored in a coarse binning buffer, until all results of the coarse binning pass are output to the coarse binning buffer.

12. A method for rendering, comprising:
for a set of primitives processed through a world-space pipeline in a coarse binning pass, outputting early draw data to an early draw buffer;
while processing the set of primitives in the coarse binning pass, in the world-space pipeline, processing the early draw data in a fine binning pass through the world-space pipeline; and
processing remaining primitives of the set of primitives in the fine binning pass in the world-space pipeline and in a screen-space pipeline.

13. The method of claim 12, wherein outputting the early draw data comprises identifying early draw primitives of the set of primitives that overlap a first coarse binning tile and outputting the early draw primitives to the early draw buffer.

14. The method of claim 12, wherein processing the early draw data in the fine binning pass includes identifying which fine binning tiles are overlapped by the early draw data.

15. The method of claim 14, further comprising processing the early draw data in fine binning tile order.

16. The method of claim 12, further comprising storing a guard token in the early draw buffer that indicates the end of the early draw data.

17. The method of claim 16, further comprising processing the remaining primitives in the fine binning pass after detecting the guard token in the early draw buffer.

18. The method of claim 12, further comprising:
performing the fine binning pass and the coarse binning pass concurrently across a plurality of rendering pipelines.

19. The method of claim 12, wherein outputting the early draw data to the early draw buffer occurs in a manner that allows reading the early draw data without any other data from the coarse binning pass.

20. The method of claim 12, wherein reading cannot be performed for results of the coarse binning pass, other than the early draw data, when stored in a coarse binning buffer, until all results of the coarse binning pass are output to the coarse binning buffer.

* * * * *